United States Patent

Manz et al.

[11] Patent Number: 5,950,671
[45] Date of Patent: Sep. 14, 1999

[54] OVER-PRESSURE PROTECTION OF A FLUID SENSOR

[76] Inventors: Anthony J. Manz; Kenneth W. Manz, both of 16852 Rd. 146, Paulding, Ohio 45879

[21] Appl. No.: 09/110,285

[22] Filed: Jul. 6, 1998

[51] Int. Cl.[6] .................................................. F16K 31/12
[52] U.S. Cl. .............................. 137/505.13; 137/505.29; 137/551
[58] Field of Search .............................. 137/505, 505.13, 137/505.29, 498, 551

[56] References Cited

U.S. PATENT DOCUMENTS

| | | | |
|---|---|---|---|
| 2,729,235 | 1/1956 | Stevenson | 137/498 |
| 2,824,573 | 2/1958 | Mason et al. | 137/505.13 |
| 3,152,607 | 10/1964 | Lundeen | 137/505.13 |
| 3,162,048 | 12/1964 | Albertson et al. | 137/505.13 |
| 3,730,215 | 5/1973 | Conery et al. | 137/505.13 X |
| 4,276,902 | 7/1981 | Roth | 137/505.29 X |
| 4,694,649 | 9/1987 | Howeth | 137/505.13 X |
| 4,874,011 | 10/1989 | Canzano et al. | 137/505.13 |

FOREIGN PATENT DOCUMENTS

| | | | |
|---|---|---|---|
| 1243761 | 9/1960 | France | 137/505.13 |
| 594874 | 5/1933 | Germany | 137/505.13 |

*Primary Examiner*—Denise L. Ferensic
*Assistant Examiner*—Ramyar Farid
*Attorney, Agent, or Firm*—Reising, Ethington, Barnes, Kisselle, Learman & McCulloch, P.C.

[57] ABSTRACT

Apparatus for protecting a fluid sensor against excess fluid pressure that includes a manifold having an internal fluid passage and a fluid inlet for connecting the passage to a fluid system. A piston is disposed within the passage adjacent to one end of the passage, and a rod extends from the piston through the passage. A valve is coupled to the rod at a position spaced from the piston, and is cooperable with the passage for selectively terminating fluid flow through the passage. A fluid sensor may be mounted on the manifold for communicating with fluid in the passage at an end thereof adjacent to the valve and remote from the piston. A spring resiliently engages the piston and urges the piston, rod and valve toward the end of the passage to open the valve. Fluid pressure at the inlet sufficient to overcome forces applied to the piston by the spring functions to close the valve and thereby to isolate the sensor from the fluid inlet.

6 Claims, 1 Drawing Sheet

OVER-PRESSURE PROTECTION OF A FLUID SENSOR

The present invention is directed to sensors such as transducers or switches for detecting a property of a fluid, and more particularly to an apparatus for protecting such a sensor from application of excess fluid pressure.

BACKGROUND AND OBJECTS OF THE INVENTION

There are many applications in industry in which it is desirable to protect a fluid transducer or switch from excess fluid pressure conditions. One example is in use of a vacuum sensor in a system for charging refrigeration equipment with refrigerant. When refrigeration equipment is evacuated of refrigerant for repair, it is necessary to remove air from the refrigeration equipment before recharging with refrigerant. This is typically accomplished by coupling a vacuum pump to the refrigeration equipment, and operating the vacuum pump until pressure within the refrigeration equipment reaches a selected vacuum threshold, such as 1000 micrometers of mercury. A vacuum sensor is employed for advising the operator of the vacuum level within the refrigeration equipment and/or automatically initiating a recharging cycle.

The vacuum sensor in such refrigeration service equipment applications typically comprises a thermistor-based sensor that responds to changes in thermal conductivity in the fluid surrounding the thermistor to indicate fluid pressure. A significant problem with sensors of this type is accuracy limitations. Furthermore, for thermistor-based sensors of the type described, both refrigerant gas and vacuum have insulating affects, so that there exists a zone of ambiguity between vacuum levels from atmospheric pressure down to some level of vacuum where the refrigerant gas no longer masks the true vacuum. Moreover, thermistor-based sensors of this type do not read accurately if coated with lubricant from the refrigeration equipment. Thermistors are capable of resisting high pressure, but can be damaged by the oil normally carried by refrigerant.

An alternative to thermistor-based sensors are linear output pressure transducers using strain gauge, capacitance or piezoelectric technologies. A refrigerating system may experience operating pressure as high as 300 psi or more. If a linear output pressure sensor is to be capable of direct exposure to the fluid at high pressure, it will be insufficiently accurate at low pressure or vacuum conditions to satisfy the necessary requirements. For example, if a sensor is accurate to 0.1% of full scale and is designed to withstand pressures up to 300 psi, then minimum measured accuracy is 0.3 psi or 15,500 micrometers. This is well above the evacuation pressure of 1000 micrometers recommended by ASHRAE.

U.S. Pat. No. 5,172,562 proposes a solution to the problem of protecting a fluid vacuum sensor from high-pressure conditions, in which the vacuum sensor is disposed between solenoid valves, one of which is responsive to a pressure switch coupled to the system inlet for preventing opening of the valve, and fluid access to the vacuum sensor, when inlet pressure is above a preselected level. This arrangement, although effective for the purpose intended, involves a multiplicity of components that increase equipment cost. Furthermore, the arrangement so disclosed is not well suited for use in conjunction with hand-held equipment, in which size and weight are important factors.

It is therefore a general object of the present invention to provide apparatus for protecting a fluid sensor against excess fluid pressure that is economical to assemble, that is compact and light in weight, and that permits use of highly sensitive vacuum sensors in applications that would otherwise be exposed to high fluid pressure conditions. Another object of the invention is to provide apparatus for protecting a fluid sensor as so described that is readily adapted for use in connection with other types of fluid sensors, such as infrared sensors for determining refrigerant type.

SUMMARY OF THE INVENTION

Apparatus for protecting a fluid sensor against excess fluid pressure in accordance with a presently preferred embodiment of the invention includes a manifold having an internal fluid passage and a fluid inlet for connecting the passage to a fluid system. A piston is disposed within the passage adjacent to one end of the passage, and a rod extends from the piston through the passage. A valve is coupled to the rod at a position spaced from the piston, and is cooperable with the passage for selectively terminating fluid flow through the passage. A fluid sensor may be mounted on the manifold for communicating with fluid in the passage at an end thereof adjacent to the valve and remote from the piston. A spring resiliently engages the piston and urges the piston, rod and valve toward the end of the passage to open the valve. Fluid pressure at the inlet sufficient to overcome forces applied to the piston by the spring functions to close the valve and thereby to isolate the sensor from the fluid inlet.

The manifold passage in the preferred embodiment of the invention has a central portion into which the inlet opens and through which the rod extends, a first enlarged end portion in which the piston and spring are disposed, and a second enlarged end portion in which the valve is disposed and with which a fluid sensor mounted on the manifold communicates. A cap is threaded onto the manifold over an end of the fluid passage for adjusting biasing force applied by the spring to the piston. The spring in the preferred embodiments of the invention comprises a coil spring, into which a post extends from the piston or the cap for maintaining axial orientation of the coil spring. The piston or cap may have a stop for abutment with the other element to limit motion of the piston in the direction closing the valve.

BRIEF DESCRIPTION OF THE DRAWING

The invention, together with additional objects, features and advantages thereof, will be best understood from the following description, the appended claims, and the accompanying drawing in which:

DETAILED DESCRIPTION OF PREFERRED EMBODIMENTS

Figure 1:
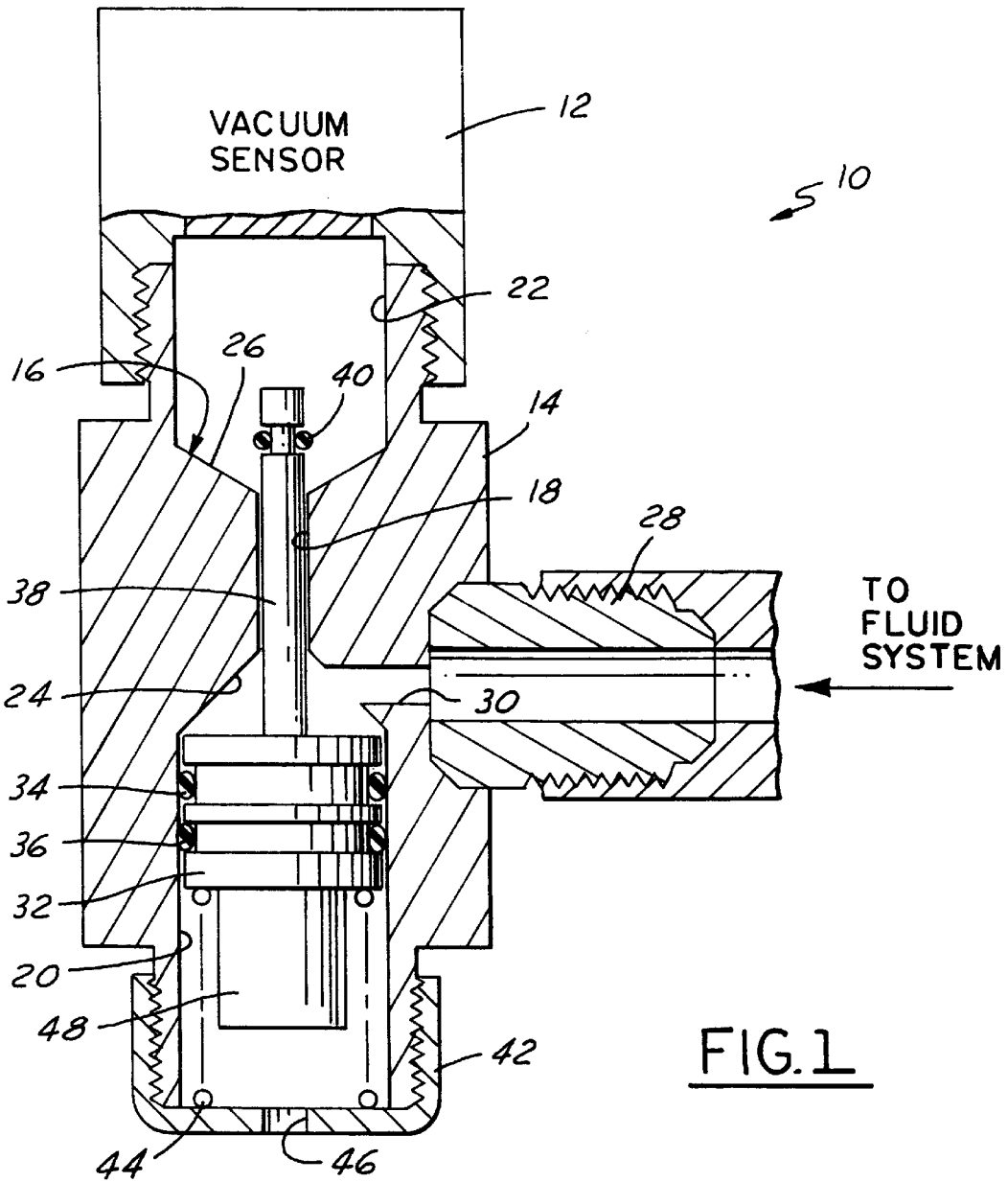
FIG. 1 is a sectional view in side elevation that illustrates apparatus for protecting a fluid sensor in accordance with one presently preferred embodiment of the invention.

FIG. 1 illustrates an apparatus 10 for providing fluid over-pressure protection for a fluid sensor 12 in accordance with one presently preferred embodiment of the invention. A manifold 14 has an axially oriented internal passage 16 that includes a central portion 18 of limited diameter interconnecting axially aligned end portions 22, 20 of greater diameter. All fluid passage portions 18, 20, 22 are circular in cross section, with end passage portions 20, 22 merging with central portion 18 by means of conical passage surfaces 24, 26, respectively. An inlet fitting 28 is secured to a sidewall of manifold 14 for connecting manifold 14 and passage 16 to a fluid system under test. Inlet fitting 28 communicates with manifold passage 16 by means of a lateral passage 30 that opens into conical surface 24 of passage 16.

A piston 32 is disposed within enlarged end portion 20 of passage 16. Piston 32 has axially spaced grooves in which a pair of O-rings 34, 36 are disposed for sealing sliding engagement with the inside wall of passage end portion 20. A rod 38 extends axially from one end face of piston 32 through central passage portion 18 into second enlarged passage end portion 22. An O-ring 40 is captured in a groove surrounding rod 38 spaced from piston 32 and adjacent to the end of rod 38 remote from piston 32. O-ring 40 is of a diameter to seal within central passage portion 18, using conical surface 26 as a guide to thereby function as a sliding O-ring valve to prevent flow of fluid into passage end portion 22. Rod 38 is affixed to piston 32 by any suitable technique, including being formed integrally with piston 32.

A cap 42 is externally threaded over manifold 14 closing the end of passage 16 adjacent to piston 32. A coil spring 44 is captured in compression between piston 32 and cap 42. Thus, coil spring 44 urges piston 32 upwardly in the orientation illustrated in FIG. 1, toward inlet passage 30 and opening O-ring valve 40 with respect to passage surface 26. The biasing force of coil spring 44 on piston 32 may be adjusted by adjusting threaded position of cap 42 on manifold 14. A fluid sensor 12 is mounted on the opposing end of manifold 14. In the embodiment illustrated in FIG. 1, sensor 12 comprises a thermistor-based vacuum transducer or a linear output pressure transducer for providing an electrical signal as a function of fluid pressure in manifold passage 16 within a limited range of low pressure conditions. Although use in connection with vacuum transducers of these types is currently preferred, sensor 12 could also comprise a vacuum switch for providing an open/closed switch output condition as a function of fluid pressure, or a fluid sensor of completely different type that must be protected against excessive pressure conditions, such as an infrared sensor for determining refrigerant type.

Figure 2:
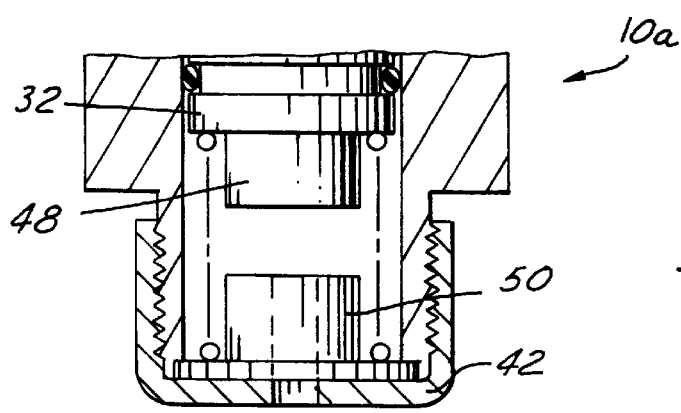
FIG. 2 is a fragmentary sectional view that illustrates a modification to the embodiment of FIG. 1.

Cap 42 has a central passage 46 for opening the end of fluid passage 16 to atmosphere. Thus, one O-ring 36 is exposed to atmospheric pressure, while the other O-ring 34 is exposed to system fluid pressure. The use of dual O-rings 34, 36 achieves improved sealing efficiency. A lug 48 extends from piston 32 into coil spring 44 to help hold the coil spring in position, and to stop travel of piston 32 against cup 42 to protect the spring and internal components. FIG. 2 illustrates a modified apparatus 10a, in which an over-pressure stop 50 is captured between coil spring 44 and cap 42 for abutment with lug 48 to limit travel of piston 32 and protect internal components of apparatus 10 when fluid pressure exceeds the design over-pressure limit. Thus, piston 32 is normally biased by spring 44 to the position illustrated in FIGS. 1 and 2. Inlet fluid may flow through passage portion 18 to and from passage portion 22 for exposure to sensor 12. If the pressure within the fluid system to which apparatus 10 is connected increases sufficiently to overcome the biasing force of spring 44, piston 32 is moved downwardly against spring 44 until O-ring valve 40 engages passage entry guide surface 26 around the upper end outlet of central passage portion 18 and then is pulled by downward travel of piston 32 to enter passage portion 18 and assume a sealing position anywhere in its travel range therein. At this position, O-ring valve 40 prevents high-pressure fluid from entering passage end portion 22 and potentially damaging sensor 12. A continuing increase in system fluid pressure holds O-ring valve 40 closed with greater force. When system fluid pressure decreases to the level at which the force caused by fluid pressure on the upper face of piston 32 is less than the force applied by spring 44, piston 32 moves upwardly and opens O-ring valve 40 by movement thereof upwardly clear of the upper end outlet of passage 18, so that sensor 12 is again exposed to the fluid.

We claim:

1. Apparatus for protecting a fluid sensor against excess fluid pressure, which comprises:

a manifold having an internal passage and inlet means for connecting said passage to a fluid system, a piston disposed in said passage, a rod extending from said piston through said passage, valve means coupled to said rod spaced from said piston and being constructed and arranged to be cooperable as a sliding annular seal when moved into and within a cooperative reduced diameter portion of said passage for selectively terminating fluid flow through said package, said reduced diameter portion of said passage comprising a narrow central portion into which said inlet means communicates and through which said rod extends and wherein said valve means sealably slides in the closed condition of said valve means, said passage also comprising a first enlarged end portion in which said piston and spring means are disposed and a second enlarged end portion in which said valve means is disposed when in the open condition thereof, said reduced diameter portion of said passage interconnecting said enlarged end portions, means for mounting a fluid sensor on said manifold for communication with fluid in said passage at said second enlarged end portion thereof adjacent to said valve means and remote from said piston, and spring means for resiliently engaging said piston and urging said piston, rod and valve means toward said second enlarged end portion of said passage to open said valve means, fluid pressure at said inlet means sufficient to overcome forces applied to said piston by said spring means functioning to close said valve means and thereby to isolate said sensor from said inlet, said valve means comprises an O-ring carried by said rod and spaced from said piston, said second enlarged end portion of said passage including a conical passage surface constructed and arranged to guide said O-ring into said narrow central portion of said passage for sliding sealing closure thereof when said O-ring is carried therein by said movement of said rod.

2. The apparatus set forth in claim 1 further comprising means operatively coupled to said manifold and to said spring means for adjusting biasing force of said spring means on said piston.

3. The apparatus set forth in claim 2 wherein said spring means comprises a coil spring.

4. The apparatus set forth in claim 3 further comprising means extending into said coil spring for maintaining position of said coil spring with said passage.

5. The apparatus set forth in claim 3 further comprising stop means for limiting movement of said piston within said passage.

6. The apparatus set forth in claim 3 wherein said force-adjusting means comprises a cap threaded into said manifold at an end of said passage adjacent to said piston.

* * * * *